Oct. 13, 1925.                                                1,557,232
                        W. S. ALLEN
                    AUTOMOBILE HEADLIGHT
                     Filed June 21, 1924
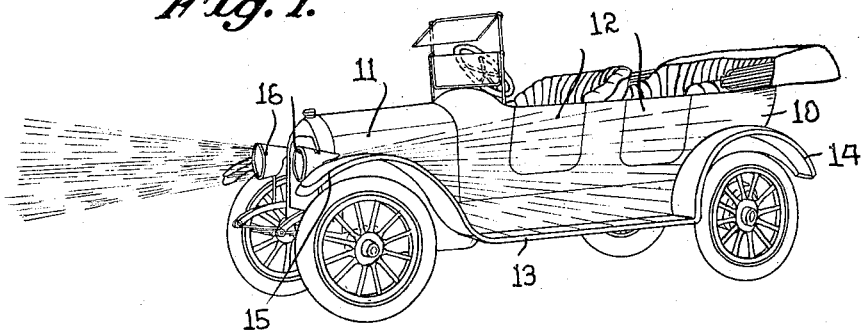
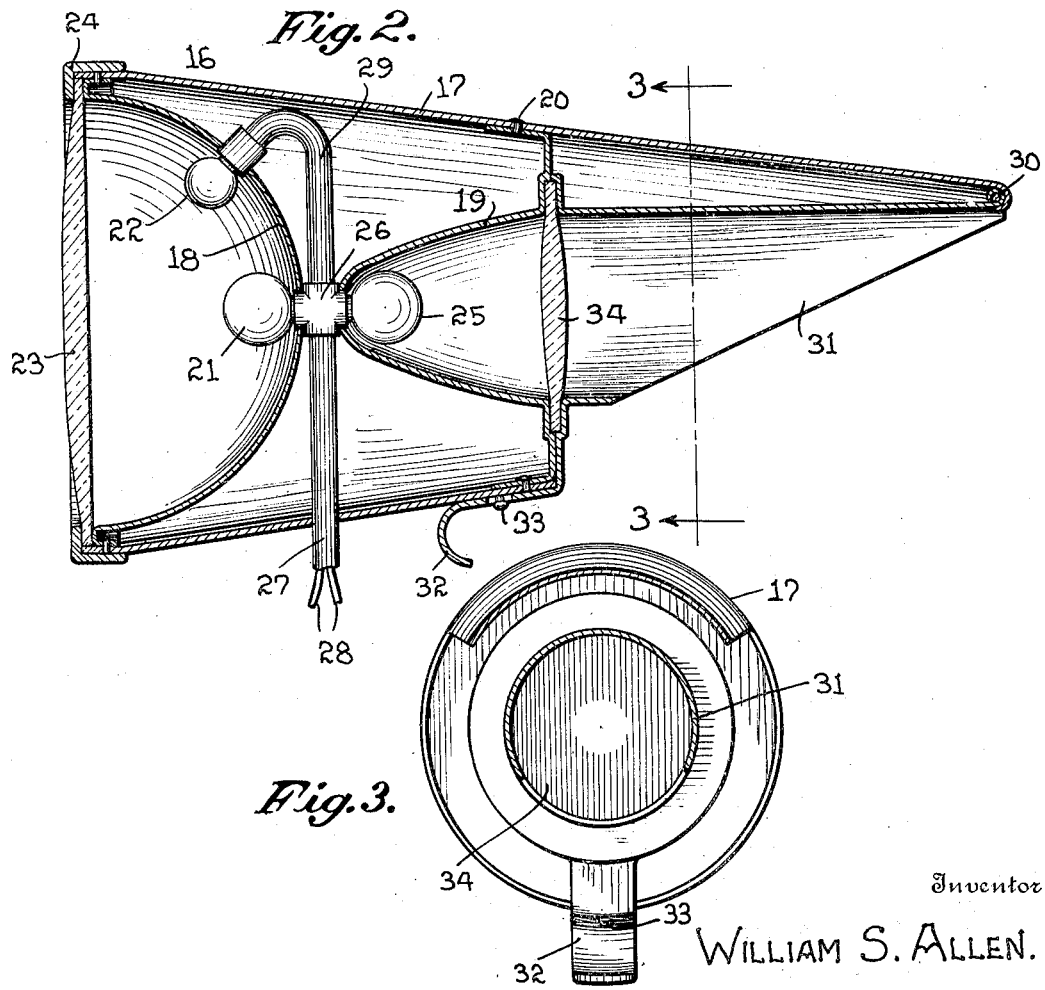

Patented Oct. 13, 1925.

1,557,232

UNITED STATES PATENT OFFICE.

WILLIAM SAYRE ALLEN, OF BIRMINGHAM, ALABAMA, ASSIGNOR OF NINE-TENTHS TO A. T. NEWELL, OF JEFFERSON COUNTY, ALABAMA.

AUTOMOBILE HEADLIGHT.

Application filed June 21, 1924. Serial No. 721,547.

*To all whom it may concern:*

Be it known that I, WILLIAM S. ALLEN, a citizen of the United States, residing at Birmingham, in the county of Jefferson and State of Alabama, have invented certain new and useful Improvements in Automobile Headlights, of which the following is a specification.

My said invention relates to a headlight for automobiles and similar vehicles, and it is an object of the invention to provide a headlight having means for illuminating the body or sides of an automobile so that they will be more clearly visible when passing another automobile, thereby obviating or at least minimizing the liability of a collision.

Another object of the invention is to provide such a device with means for illuminating the running boards and doors so that passengers may clearly see to get aboard or alight from the automobile at night.

A further object of the invention is to provide means for projecting light to the rear of the automobile for illuminating the roadway and providing light for removing or replacing tires.

A still further object of the invention is to provide a headlight which may be used to illuminate the motor when it is desired to supply oil or the like thereto and when working on the same.

Still another object of the invention is to illuminate the roadway, sides of the automobile and the like, without blinding the eyes of the driver of the vehicle or of an approaching vehicle.

I obtain these objects by providing a headlight having a front and rear reflector with sources of light in each and lenses in front of said reflectors supported in a single casing or shell. A front lens and reflector of the ordinary type may be used; however, the rear reflector should the preferably parabolic in form to concentrate the rays of light and project them in a parallel manner thereby intensifying the same.

Referring to the accompanying drawings which are made a part hereof and on which similar reference character indicate similar parts, Figure 1 is a perspective view of an automobile equipped with my improved headlights;

Figure 2 is a verticle central section through one of said headlights; and

Figure 3 is a section on the line 3—3 of Figure 2.

In the drawings reference character 10 indicates the body of an automobile having a hood 11, doors 12, running board 13, and front and rear fenders 15 and 14, respectively. Adjacent the front fenders 15 are mounted a pair of headlights 16.

Each headlight 16 is provided with an outer shell or casing 17 tapering from the front to the rear thereof and in which are secured front and rear reflectors 18 and 19 respectively by means of fastening devices 20 passing through flanges integral with the reflectors. These flanges are tapered correspondingly to and are arranged concentrically with the casing 17 and fit closely therein to hold the reflectors securely in place. The front reflector is preferably substantially semi-spherical in shape and is provided substantially centrally thereof with a source of illumination here shown as an electrical lamp 21 and an auxiliary source of illumination 22 spaced above the same. At the front of the lamp is provided a lens 23 of any desired type secured in place by means of a cap 24 attached to the shell 17. Obviously gaskets (not shown) may be provided for cushioning jars and preventing breakage of the lens.

The rear reflector 19 is preferably parabolic in shape with its central portion disposed adjacent the central portion of the first reflector and provided with a lamp 25. A common holder or four-way connection 26 is provided for the lamps 21 and 25 and a common source of electricity comprising a conduit or post 27 having wires 28 entering the shell at the bottom and secured in a conventional manner to the holder or connection 26.

Extending upward from the holder 26 is a post or conduit 29 for furnishing electricity to the lamp 22. The rear end of the casing 17 is substantially the shape of a half cone and forms a shield to prevent upward reflection of the light. Attached by means of a hinge 30 at the outer end of the casing 17 is an auxiliary reflector 31 having a clamp 32 for engagement over a pin 33 for securing said reflector in place. The reflector 31 is circular in cross-section but is cut away at an angle from a point adjacent its front end to a point adjacent its supporting hinge. The contiguous ends of the reflectors 19 and 31 are provided with co-operating shouldered recesses for the accommodation of a lens 33.

With this construction light will be thrown not only ahead of the automobile, but rearwardly on the hood 11, doors 12, running board 13, and fender 14, and will also be reflected to the rear of the automobile to provide light for backing and at the same time the eyes of the driver will be protected from the glare of the light.

It will be obvious to those skilled in the art that various changes may be made in my device without departing from the spirit of the invention and therefore I do not limit myself to the specific device shown in the drawings and described in the specification but only as indicated in the appended claims.

Having thus fully described my said invention what I claim as new and desire to secure by Letters Patent, is:

1. In an automobile headlight a conical casing a forwardly directed reflector within the larger end of said casing for directing the light along the path of travel, a rearwardly directed reflector within the smaller end of said casing for directing the light rearwardly and against the vehicle body, the smaller end of said casing being cut away to provide a rearwardly extending tapered overhanging portion, said rearwardly directed reflector comprising a plurality of sections, the section at the inner end being parabolical in form and the section forming the outer end being pivoted at its outer end to said overhanging portion, substantially as set forth.

2. An automobile headlight comprising a casing a forwardly and a rearwardly directed reflector within the casing for directing the rays of light along the path of travel and against the vehicle body respectively, means for mounting a lamp adjacent each reflector, a lens for the forwardly directed reflector, said rearwardly directed reflector being composed of cooperating sections, the inner section of said rearwardly directed reflector being secured to the casing and having an annular recess in its outer circumference, the outer section of said rearwardly directed reflector having an annular recess corresponding to the recess in the cooperating section for accommodation of a lens said outer section being pivoted to the casing at its outer end and having means for fastening the parts in cooperative relation, substantially as set forth.

3. An automobile headlight comprising a casing, a forwardly and a rearwardly directed reflector within the casing for directing rays of light along the path of travel and against the vehicle body respectively, means for mounting a lamp adjacent each reflector, a lens for the forwardly directed reflector said casing having a tapered rearwardly extending portion, an auxiliary reflector having one end hingedly secured to the outer end of said extension, the opposite end of said auxiliary reflector abutting the rearwardly directed reflector, and a lens clamped between said abutting reflectors, substantially as set forth.

4. In a headlight a casing having an overhanging portion, a reflector comprising a plurality of sections, the forward section being pivoted to said overhanging portion at its outer end and having its inner end disposed in alinement with the other section, and a lens between the sections of the reflector, substantially as set forth.

In witness whereof, I have hereunto set my hand and seal at Birmingham, Alabama this 18th day of June, A. D. nineteen hundred and twenty-four.

WILLIAM SAYRE ALLEN. [L. S.]